United States Patent
Park et al.

(10) Patent No.: US 8,400,026 B2
(45) Date of Patent: Mar. 19, 2013

(54) CIRCUITS AND METHODS FOR CONTROLLING SUPERCAPACITORS AND KITS FOR PROVIDING THE SAME

(75) Inventors: Kwangsoo Park, Suwon-si (KR); Kyoungsub Oh, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 334 days.

(21) Appl. No.: 12/847,173

(22) Filed: Jul. 30, 2010

(65) Prior Publication Data

US 2011/0031811 A1    Feb. 10, 2011

(30) Foreign Application Priority Data

Aug. 7, 2009   (KR) .................. 10-2009-0072910

(51) Int. Cl.
    *H02M 3/06*    (2006.01)
(52) U.S. Cl. ........................................ 307/109
(58) Field of Classification Search .................. 307/109
     See application file for complete search history.

(56) References Cited

U.S. PATENT DOCUMENTS

| | | | | |
|---|---|---|---|---|
| 5,702,426 | A | * | 12/1997 | Pons et al. ................. 607/27 |
| 2010/0146333 | A1 | * | 6/2010 | Yong et al. ................. 714/14 |
| 2010/0156369 | A1 | * | 6/2010 | Kularatna et al. ........... 323/282 |

FOREIGN PATENT DOCUMENTS

| | | |
|---|---|---|
| JP | 10-336919 A | 12/1998 |
| JP | 2005-278366 A | 10/2005 |
| JP | 2008-029064 A | 2/2008 |
| KR | 10-2008-0062684 A | 7/2008 |

* cited by examiner

*Primary Examiner* — Robert L. Deberadinis
(74) *Attorney, Agent, or Firm* — Myers Bigel Sibley & Sajovec, P.A.

(57) ABSTRACT

A circuit can include a supercapacitor switch including first and second terminals, that is configured to electrically couple the terminals to one another in a closed position and to electrically de-couple the terminals from one another in an open position responsive to a supercapacitor switch control signal. A first supercapacitor has a first terminal that is electrically coupled to the first terminal of the supercapacitor switch and has a second terminal that is electrically coupled to a reference voltage. A second supercapacitor has a first terminal that is electrically coupled to the second terminal of the supercapacitor switch and has a second terminal that is electrically coupled to the reference voltage.

22 Claims, 18 Drawing Sheets

CIRCUITS AND METHODS FOR CONTROLLING SUPERCAPACITORS AND KITS FOR PROVIDING THE SAME

CROSS-REFERENCE TO RELATED APPLICATIONS

The present application claims priority to Korean Patent Application No. 10-2009-0072910, filed in the Korean Intellectual Property Office on Aug. 7, 2009, the disclosure of which is incorporated herein by reference.

FIELD OF THE INVENTION

The present inventive concept relates to the field of electronics in general, and more particularly, to electric double layer capacitors.

BACKGROUND

Solid State Devices (SSDs) can function as data storage devices utilizing non-volatile solid state memory devices (such as flash memory) to store data in a persistent manner regardless of whether external power is provided thereto. SSDs are sometimes used as an alternative to hard drives, which can have longer access times and may have other disadvantages associated with the mechanical nature of a disk. An SSD may avoid some of the known challenges of electromagnetic magnetic interference, susceptibility to physical shock, as well as general reliability issues associated with mechanical disk drives.

SSDs can operate on commonly available power sources, such as 110V and 220V as external power. If the external power is suddenly removed, however, the SSD may be damaged.

SUMMARY

Embodiments according to the inventive concept can provide circuits and methods for controlling super capacitors and kits for providing the same. Pursuant to these embodiments according to the inventive concept, a circuit can include a supercapacitor switch including first and second terminals, that is configured to electrically couple the terminals to one another in a closed position and to electrically de-couple the terminals from one another in an open position responsive to a supercapacitor switch control signal. A first supercapacitor has a first terminal that is electrically coupled to the first terminal of the supercapacitor switch and has a second terminal that is electrically coupled to a reference voltage. A second supercapacitor has a first terminal that is electrically coupled to the second terminal of the supercapacitor switch and has a second terminal that is electrically coupled to the reference voltage.

Methods of controlling a super capacitor circuit can be provided by switching at least one currently un-used supercapacitor into an electronic device auxiliary power circuit based on an in-circuit determined quality indication associated with a currently used supercapacitor used to provide auxiliary power to the electronic device.

A kit for installation of a supercapacitor can include a supplemental supercapacitor that is configured for installation in an electronic device auxiliary power circuit already including an installed supercapacitor and a switch, that is configured for electrical coupling of the supplemental supercapacitor installed in the electronic device auxiliary power circuit to the installed supercapacitor in use by the electronic device auxiliary power circuit, wherein the switch is configured to operate responsive to a supercapacitor switch control signal provided by a supercapacitor controller circuit included in the electronic device auxiliary power circuit to switch the supplemental supercapacitor into the electronic device auxiliary power circuit after determining that a capacitance of the existing supercapacitor is below an acceptable level.

DESCRIPTION OF EMBODIMENTS ACCORDING TO THE INVENTIVE CONCEPT

Figure 1:
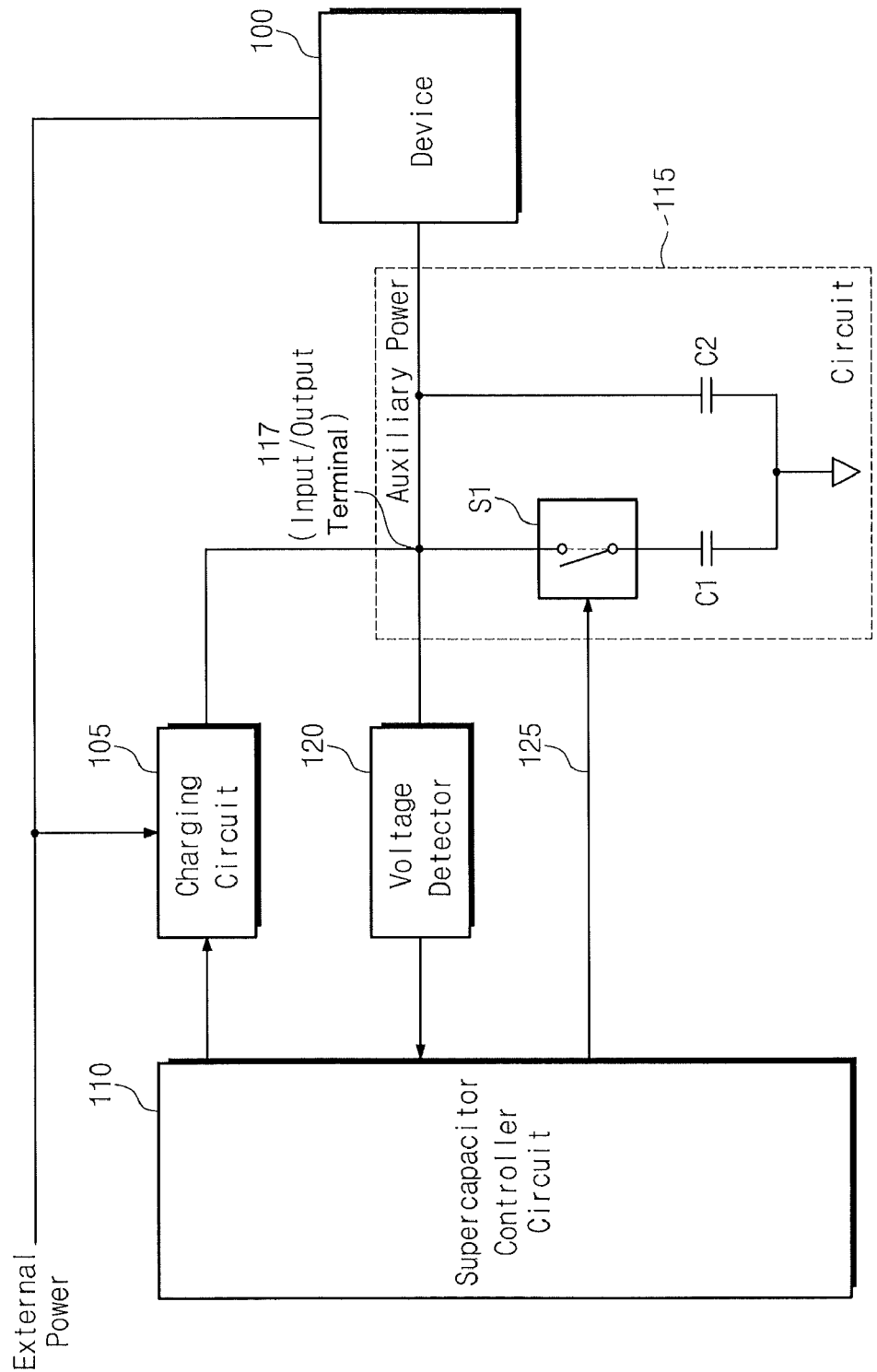
FIG. 1 is a block diagram illustrating a circuit including supercapacitors used to provide auxiliary power to a device in some embodiments according to the inventive concept.

The present inventive concept is described more fully hereinafter with reference to the accompanying drawings, in which embodiments according to the inventive concept are shown by way of example. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art.

It will be understood that when an element is referred to as being "connected to," "coupled to" or "responsive to" (and/or variants thereof) another element, it can be directly connected, coupled or responsive to the other element or intervening elements may be present. In contrast, when an element is referred to as being "directly connected to," "directly coupled to" or "directly responsive to" (and/or variants thereof) another element, there are no intervening elements present. Like numbers refer to like elements throughout. As used herein, the term "and/or" includes any and all combinations of one or more of the associated listed items and may be abbreviated as "/".

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising" (and/or variants thereof), when used in this specification, specify the presence of stated features, integers, steps, operations, elements, and/or components, but do not preclude the presence or addition of one or more other features, integers, steps, operations, elements, components, and/or groups thereof. In contrast, the term "consisting of" (and/or variants thereof) when used in this specification, specifies the stated number of features, integers, steps, operations, elements, and/or components, and precludes additional features, integers, steps, operations, elements, and/or components.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

The present inventive concept may be embodied in hardware and/or in software (including firmware, resident software, micro-code, etc.) including a combination of both. For example, controller circuits according to some embodiments of the present inventive concept may be implemented as a processor circuit that operates according to software executed by the processor circuit. Furthermore, the present inventive concept may take the form of a computer program product comprising a computer-usable or computer-readable non-transient storage medium having computer-usable or computer-readable program code embodied in the medium for use by or in connection with an instruction execution system.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the block and/or flowchart block or blocks.

The computer code may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

As used herein the term "supercapacitor" includes capacitors commonly referred to as electric double-layer capacitors, supercondensers, pseudocapacitors, electrochemical double layer capacitors, and/or ultra capacitors, which can include plates that may be considered two layers of the same substrate, where the electrical properties of the electric double-layer can result in the effective separation of charge thereon despite the very small physical separation of the layers. For example, some supercapacitor plates are separated by a few nanometers. Supercapacitors may be characterized as having a relatively high energy density. For example, some supercapacitors have a capacitance that is thousands of times greater than a high capacity electrolytic capacitor.

FIG. 1 is a block diagram which illustrates a circuit 115 including supercapacitors used to provide auxiliary power to a device 100 in some embodiments according to the inventive concept. According to FIG. 1, external power is provided to the device 100, which may be a Solid State Device (SSD) including non-volatile solid state memory devices which can persistently store data despite the absence of the external power.

Although FIG. 1, and the other figures included herein, refer to the device 100 as an SSD, it will be understood that embodiments according to the inventive concept can be utilized with any device which makes use of power can benefit from auxiliary power when external power is suddenly removed. It will be further understood the auxiliary power can be used by the device 100 passively or can be actively switched once the absence of external power is detected. For example, in some embodiments according to the inventive concept, the device 100 can be provided with the option of auxiliary power at all times including while external power is actively being provided to the device 100. Accordingly, once external power is removed, the device 100 can transition to auxiliary power with minimal intervention. In other embodiments according to the inventive concept, the device 100 (or another support circuit associated with the device 100) can detect the absence of the external power and then actively switch to the auxiliary power to preserve orderly operation of the device 100.

As further shown in FIG. 1, the external power is also provided to a charging circuit 105 which operates under the control of a supercapacitor controller circuit 110. The charging circuit 105 is electrically coupled to an input/output terminal 117 of the circuit 115 and is configured to charge supercapacitors included in the circuit 115, to provide the auxiliary power to the device 100 when external power is removed. As further shown in FIG. 1, a voltage detector circuit 120 is electrically coupled to the input/output terminal 117 so that the voltage at the supercapacitors can be monitored during charging.

The circuit 115 includes a first supercapacitor C1 electrically coupled in series with a switch S1 between the input/output terminal 117 and a reference voltage level. The switch S1 operates responsive to a supercapacitor switch control signal 125 to couple/decouple the first supercapacitor C1 from the input/output terminal 117. When the first supercapacitor C1 is coupled to the input/output terminal 117 by the switch S1, the first supercapacitor C1 can be charged by the charging circuit 105 and discharged when providing auxiliary power to the device 115. When the first supercapacitor C1 is decoupled from the input/output terminal 117 by the switch S1, the first supercapacitor C1 is not charged and is not used to provide auxiliary power.

The circuit 115 also includes a second supercapacitor C2 electrically coupled in series between the input/output terminal 117 and the reference voltage of the circuit 115. Accordingly, the second supercapacitor C2 can be charged by the charging circuit 105 and discharged when providing auxiliary power to the device 115.

In general operation, the supercapacitor controller circuit 110 coordinates the charging of the supercapacitors to prepare for when auxiliary power is needed. When auxiliary power is needed by the device 100, the supercapacitor that is electrically coupled to the input/output terminal 117 is discharged. When external power is later restored to the device 100, the supercapacitor controller circuit 110 again coordinates the charging of the supercapacitor to prepare for the next time when external power is removed. This process of charging and discharging can cause the capacitance of the supercapacitor to a decrease until the capacitance reaches an acceptable level below which the supercapacitor may not provide sufficient charge when called upon to provide auxiliary power.

When the acceptable level is determined to have been reached, however, the supercapacitor controller circuit 110 can electrically couple a new (currently unused) supercapacitor to the input/output terminal 117. Subsequently, the new supercapacitor is charged by the charging circuit, which then can provide increased capacitance for charge delivery when called upon to provide auxiliary power.

Figure 2:
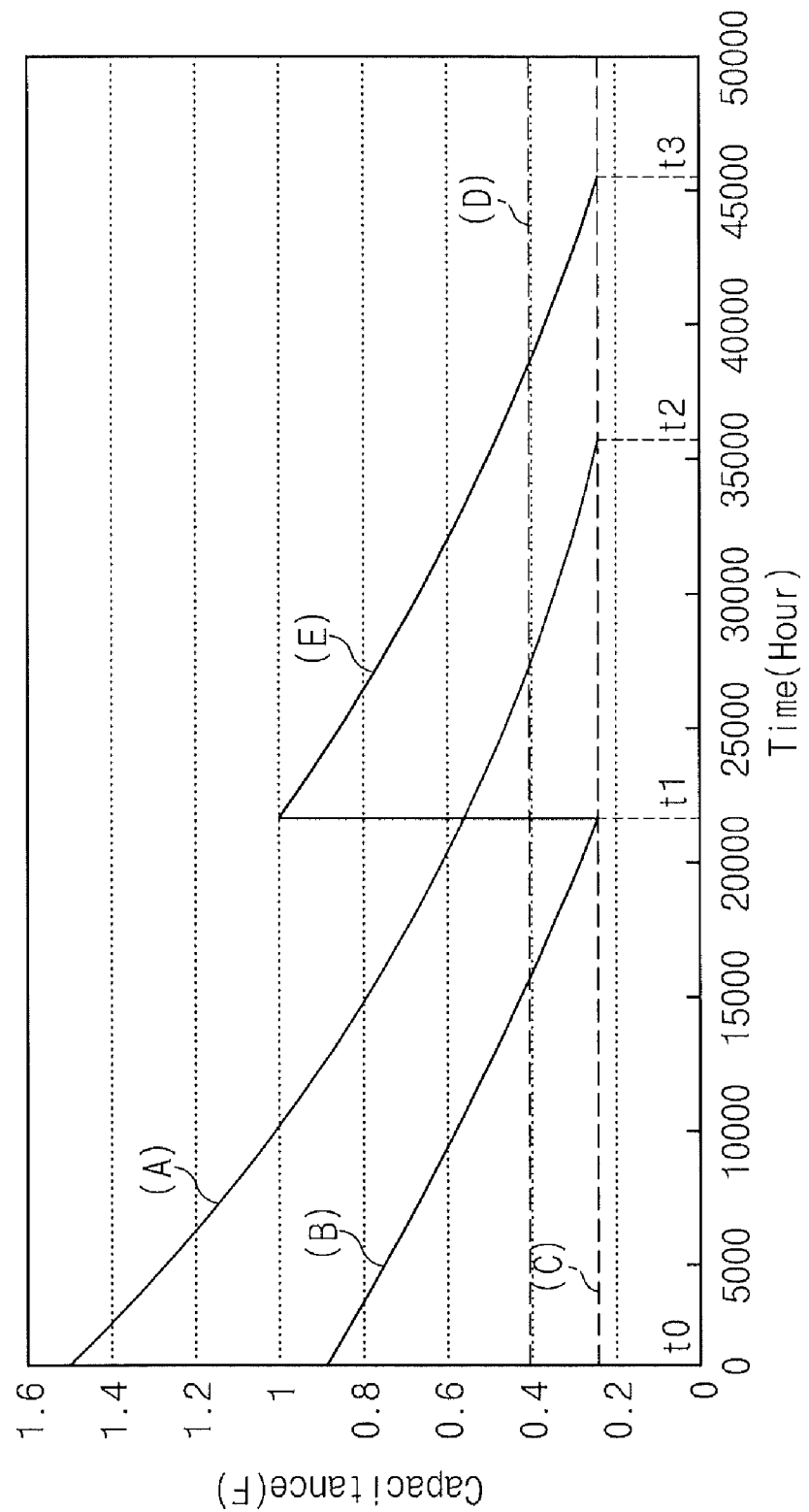
FIG. 2 is a graph which illustrates differences between a conventional approach using supercapacitors compared to circuits used to provide supercapacitors as auxiliary power in some embodiments according to the inventive concept.

FIG. 2 is a graph which comparatively illustrates the performance of a conventional approach using supercapacitors as a source of auxiliary power relative to embodiments according to the inventive concept as illustrated for example in FIG. 1. A conventional approach, illustrated by graph (A), shows the use of two supercapacitors, simultaneously, to provide auxiliary power. According to graph A, the total effective capacitance provided by such a conventional approach begins (at t0) with an initial value and is reduced over time (reflecting repeated charging/discharging to provide auxiliary power) and reaches a pre-determined acceptable level (C) at time t2, below which the total capacitance is deemed to be unacceptable such that the conventionally combined supercapacitors can no longer reliably provide auxiliary power to the device.

In contrast, graph (B) illustrates performance data utilizing the same supercapacitor values used in association with graph (A), which shows using the supercapacitors in a serial order rather than simultaneously. In particular, at time t1 the first used supercapacitor is deemed to have reached the pre-determined acceptable capacitance level (C), where the supercapacitor is no longer able to reliably provide auxiliary power for the device 100. In response, the new supercapacitor is added to the initially used supercapacitor, which increases the total effective capacitance beginning at time t1 to level (E). Subsequently, the two supercapacitors are used in combination with one another to provide auxiliary power to the device, whereupon the combined capacitance degrades over time until reaching the acceptable level (C) at time t3. As shown in FIG. 2, sequentially switching in the additional supercapacitor after the initial supercapacitor is degraded, can increase the effective lifetime of the supercapacitors by the difference between t3 and t2.

It will be understood that, although embodiments according to the inventive concept described above use the same acceptable level C for both the initial operation when only a single supercapacitor is used and for the subsequent operation when both supercapacitors are combined supercapacitor C1 and C2, the particular acceptable level associated with the combination may be different than the acceptable level C. For example, as shown in FIG. 2, the particular acceptable level associated with the combined supercapacitors can be represented by graph level D which is greater than level C. In still further embodiments according to the inventive concept, the acceptable level of the combination of the supercapacitors is less than C.

Figure 3:
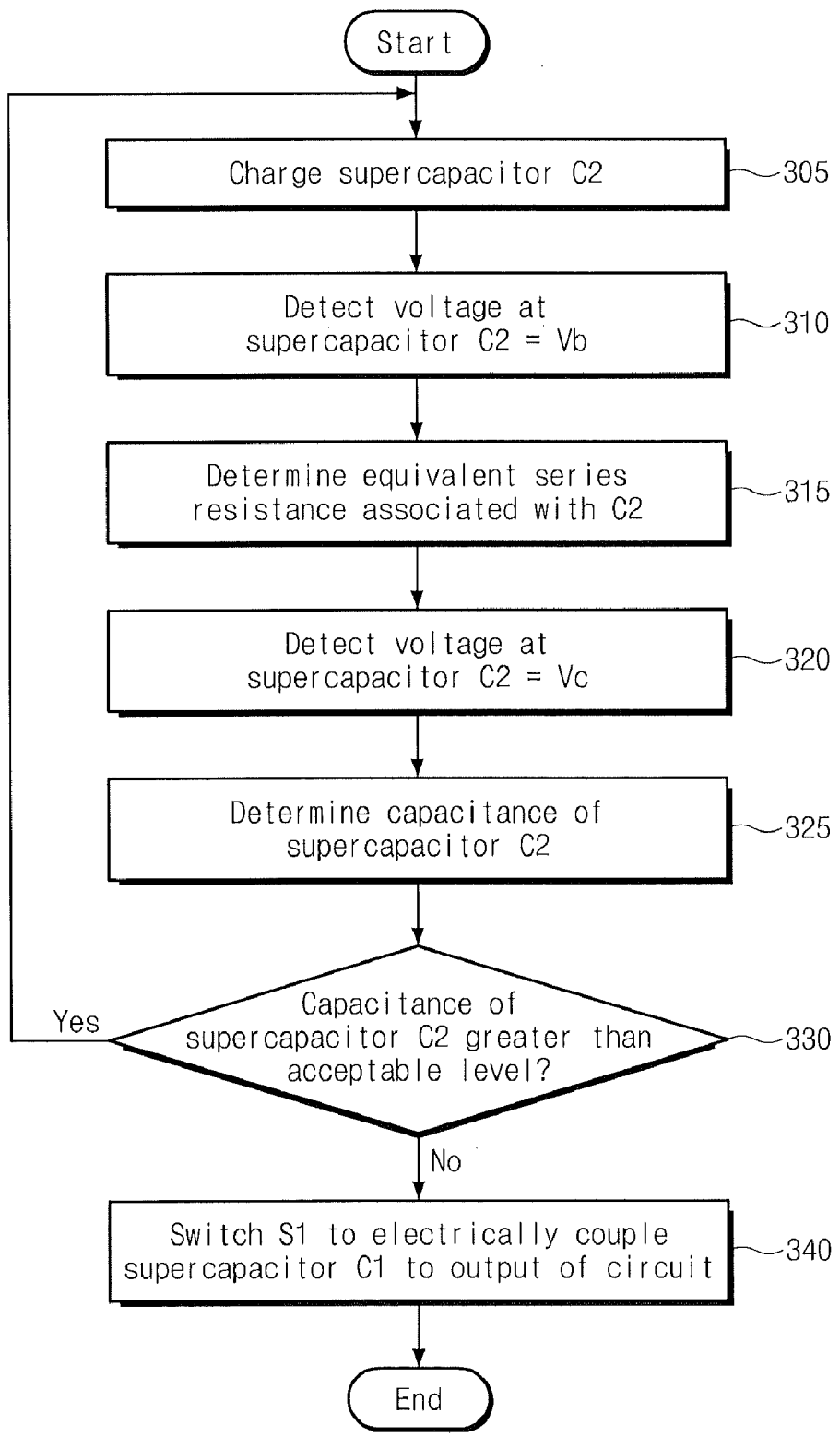
FIG. 3 is a flowchart which illustrates operations of a circuit including supercapacitors used to provide auxiliary power to a device in some embodiments according to the inventive concept.

FIG. 3 is a flowchart which illustrates the operations of a supercapacitor controller circuit 110 of FIG. 1 in some embodiments according to the inventive concept. According to FIG. 3, in an initial state the switch S1 is in the open position responsive to the supercapacitor switch control signal 125. During initial operation, only the second supercapacitor C2 is used to provide auxiliary power to the device 100 as needed. The second supercapacitor C2 is called upon to provide the auxiliary power to the device 100 when, for example, external is suddenly removed. Over time, and as illustrated in FIG. 2, as the second supercapacitor C2 is repeatedly charged/discharged to provide auxiliary power, the effective capacitance of the second supercapacitor C2 is reduced due to, for example, internal factors which reflect the quality of the supercapacitor C2. For example, the equivalent series resistance of the second supercapacitor C2 can increase over time as the second supercapacitor C2 is repeatedly charged/discharged. The equivalent series resistance can also be affected by the internal temperature of the second supercapacitor C2. Therefore, as the equivalent series resistance of the second capacitor C2 increases, the second supercapacitor C2 is deemed to be less effective to provide the auxiliary power.

Figure 4:
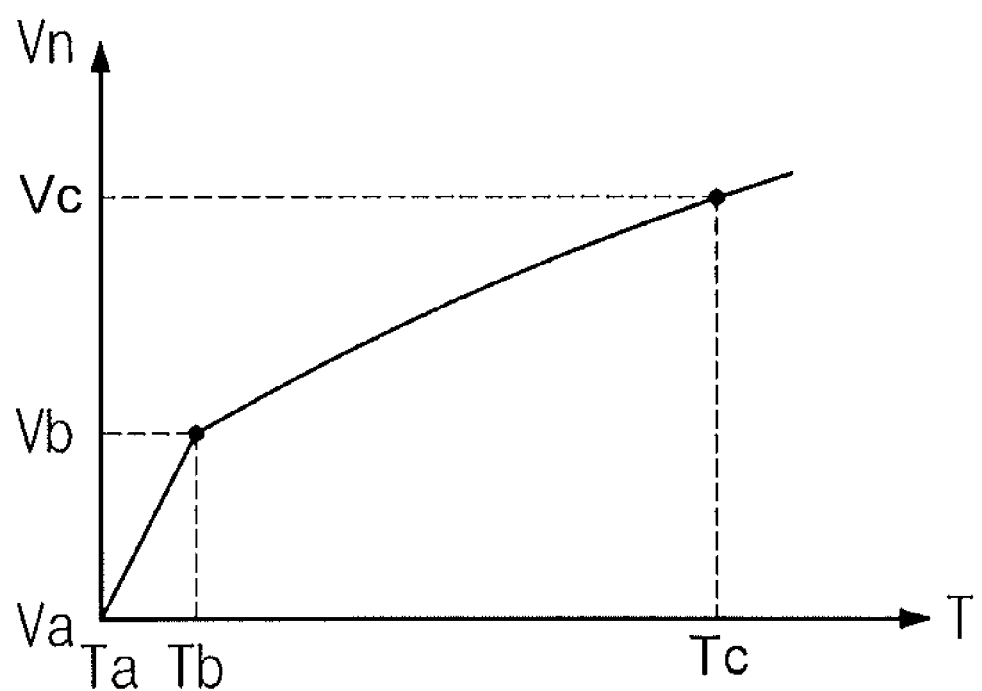
FIG. 4 is a graph which illustrates charging of supercapacitors in a circuit used to provide auxiliary power to a device in some embodiments according to the inventive concept.

Referring again to FIG. 3, the charging circuit 105 provides a charging current to the input/output terminal 117 to charge the second supercapacitor C2 after, for example, the charge on the second supercapacitor C2 has been depleted due to providing auxiliary power to the device 100 (Block 305). During an initial charging time interval charging the second supercapacitor C2, the voltage detector circuit 120 detects the voltage at the input/output terminal 117 and provides the value to the supercapacitor controller circuit 110. The circuit 110 monitors the voltage at the input/output terminal 117 to determine when the voltage has transitioned from an initial voltage Va at time Ta to a voltage Vb at time Tb as illustrated in FIG. 4 (Block 310).

It will be understood that during this initial charging interval, the voltage developed at the input/output terminal 117 can be essentially linear so that the equivalent series resistance of the second supercapacitor C2 can be determined (Block 315). For example, in some embodiments according to the inventive concept, the equivalent series resistance can be provided by the following relationship defined as equation (1):

$$ESR = \frac{Vb - Va}{Ic}$$

where Vb represents the voltage reached at the termination of the linear portion of the initial charging interval, Va represents the beginning voltage in the initial charging interval, and Ic is the current provided by the charging circuit 105 during the initial charging interval. Accordingly, the supercapacitor controller circuit 110 can utilize the essentially linear relationship between the voltage and current during the initial charging interval to determine the equivalent series resistance once the voltage at the input/output terminal 117 has reached the Vb.

Still referring to FIG. 3, the charging circuit 105 continues to charge the second supercapacitor C2 until the voltage at the input/output terminal 117 reaches Vc (Block 320) whereupon the supercapacitor controller circuit 110 can calculate the effective capacitance of the second supercapacitor C2 in combination with the equivalent series resistance determined during the initial charging interval (Block 325).

If the supercapacitor controller circuit 110 determines that the effective capacitance of the second supercapacitor C2 is greater than the acceptable level (Block 330), the supercapacitor controller circuit 110 maintains the switch S1 in the open position so that only C2 is charged by the charging circuit 105 as well as used to provide auxiliary power to the device 100. If, however, the effective capacitance of the second supercapacitor C2 is determined to be less than the acceptable level (Block 330) the supercapacitor controller circuit 110 closes the switch S1 to electrically couple the first supercapacitor C1 in parallel with the second supercapacitor C2 (Block 340). Accordingly, once the supercapacitor controller circuit 110 switches the first supercapacitor C1 in parallel with the second supercapacitor C2, the charging circuit 105 will then charge both the first and second supercapacitor C1 and C2 in parallel with one another. Moreover, when called upon to provide auxiliary power, the circuit 115 will use both the first and second supercapacitor C1 to provide the auxiliary power to the device 100.

Although embodiments according to the inventive concept are described herein as operating to determine the total effective capacitance associated with a supercapacitor by determining the equivalent series resistance and the capacitance of the supercapacitor, the determination of whether the supercapacitor can provide an acceptable level of capacitance can be based on any quality indication associated with the supercapacitor. For example, in some embodiments according to the inventive concept, the suitability of the supercapacitor can be based upon a determination of the lossiness of the supercapacitor. In still other embodiments according to the inventive concept, the determination of the capacitance level associated with the supercapacitor can be based on a determination of the equivalent series resistance without separately determining the capacitance. In such embodiments according to the inventive concept, the equivalent series resistance may be determined during the initial charging (or discharging) time interval and therefore may avoid the subsequent determination of the capacitance during a second time interval as part of the charging or discharging of the respective supercapacitor.

Figure 5:
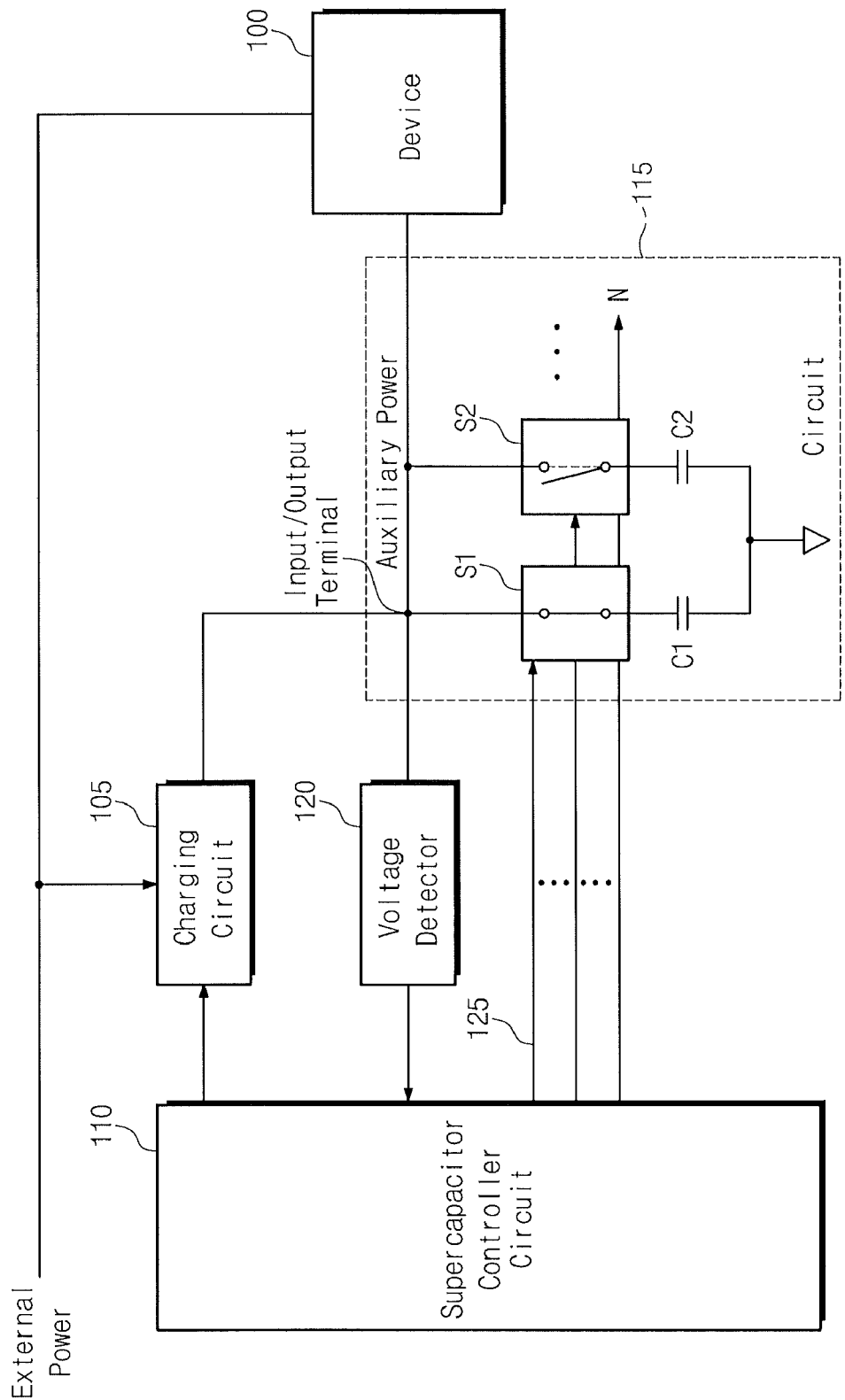
FIG. 5 is a block diagram which illustrates a circuit including supercapacitors used to provide auxiliary power to a device in some embodiments according to the inventive concept.

FIG. 5 is a block diagram illustrating the circuit 115 used to provide auxiliary power to the device 100 in some embodiments according to the inventive concept. According to FIG. 5, the circuit 115 includes N branches where each branch includes a respective switch and supercapacitor coupled in series. The first branch includes the first switch S1 and the first supercapacitor C1. The second branch includes a second switch S2 coupled in series with the second supercapacitor C2. Still further, remaining branches included in the circuit 115 also include a corresponding switch and supercapacitor coupled in series therewith and in parallel with each of the other branches in the circuit 115. The supercapacitor controller circuit 110 can provide independent control signals to control the position of each of the respective switches S1-SN. For example, the supercapacitor controller circuit can control the switches S1-SN to select which of the supercapacitors C1-CN are charged and used to provide auxiliary power to the device 100.

Figure 6:
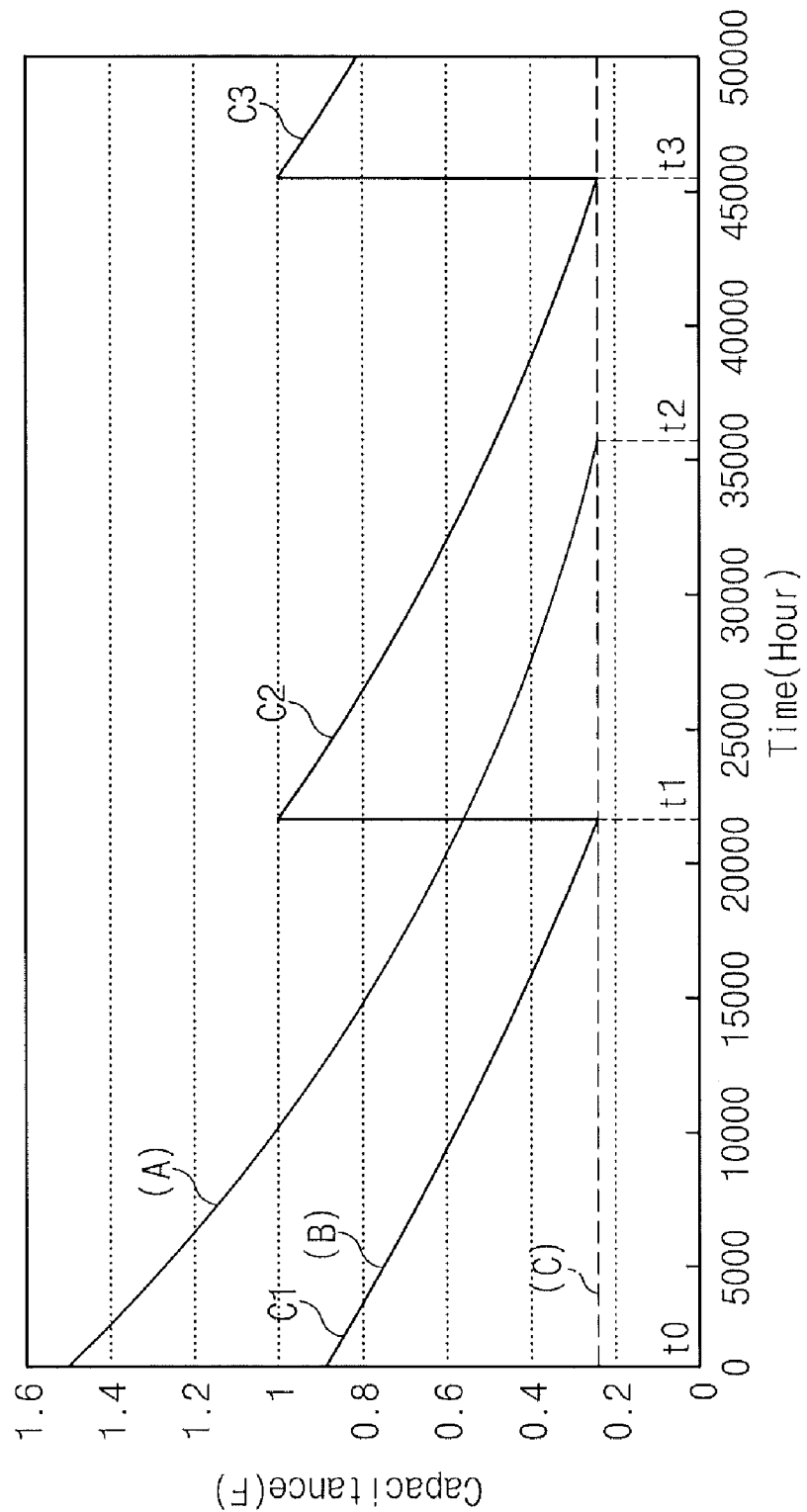
FIG. 6 is a graph which illustrates differences between a conventional approach using supercapacitors compared to circuits used to provide supercapacitors as auxiliary power in some embodiments according to the inventive concept.

FIG. 6 is a graph which illustrates comparative performance of a conventional approach illustrated by graph (A) which reflects the same arrangement illustrated by graph (A) in FIG. 2. Graph (B) illustrates performance of the circuit 115 shown in FIG. 5, utilizing the same the capacitance values as those used in graph (A). In particular, the total effective capacitance provided by the circuit 115 initially reflects the use of the supercapacitor C1, whereas all other supercapacitors are decoupled from the input/output terminal 117. Over time the capacitance of the first supercapacitor C1 is depleted to the acceptable level C at t1 and the supercapacitor controller circuit 110 switches the second supercapacitor C2 to the input/output terminal 117 while also switching out the first supercapacitor C1. After time t1, only supercapacitor C2 is charged and used to provide the auxiliary power to the device 100. Over time, the total effective capacitance of supercapacitor C2 is diminished to the acceptable level at t3, when the supercapacitor controller circuit 110 switches in the next supercapacitor and switches out supercapacitor C2. It will be understood that this operation can proceed sequentially to utilize each of the supercapacitors included in the circuit 115 shown in FIG. 5. It will also be understood that although the capacitance values of the each of the supercapacitors is shown as being equal, the supercapacitor values may be different in some embodiments according to the inventive concept.

Figure 7A:
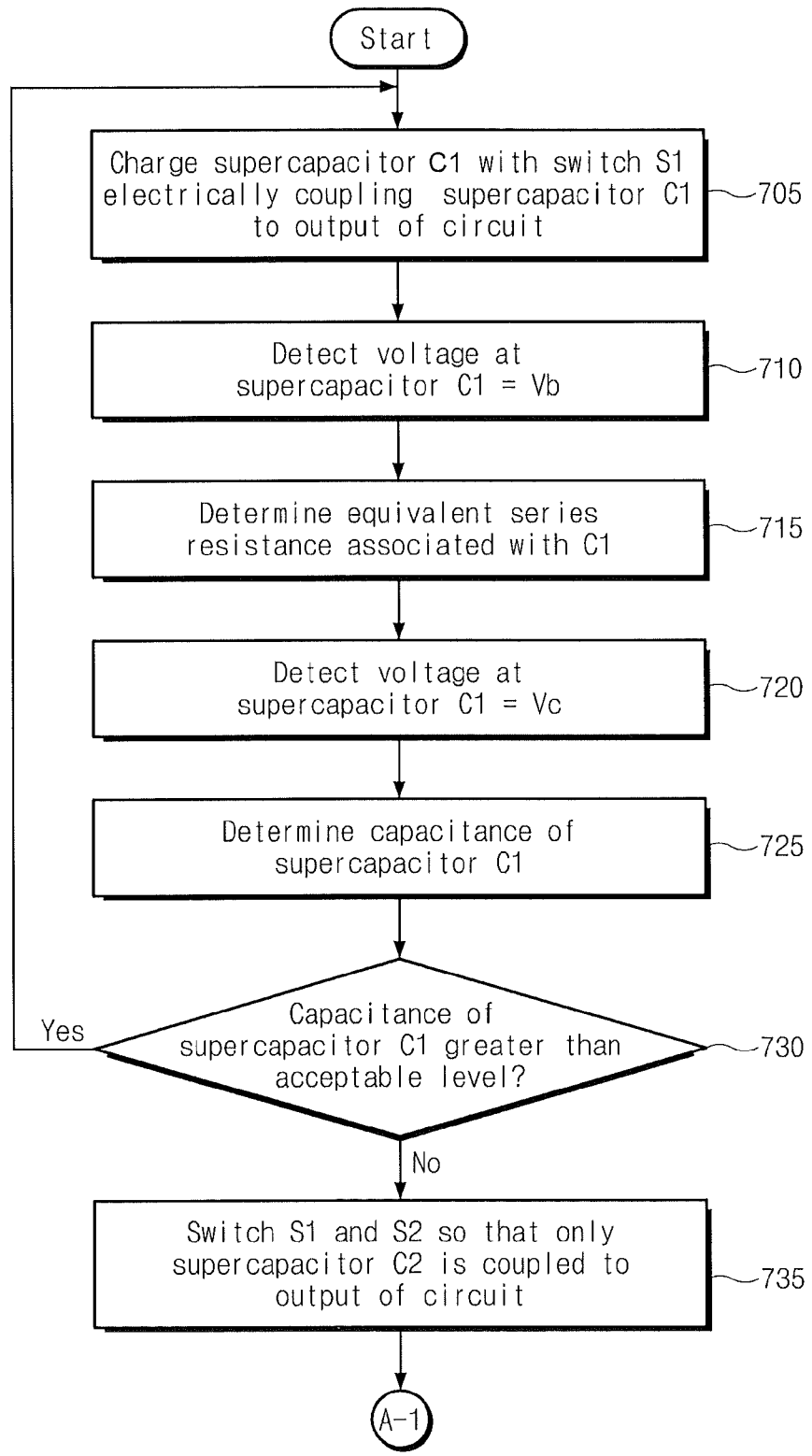
FIG. 7 is a flowchart which illustrates operations of a circuit including supercapacitors used to provide auxiliary power to a device in some embodiments according to the inventive concept.
Figure 7B:
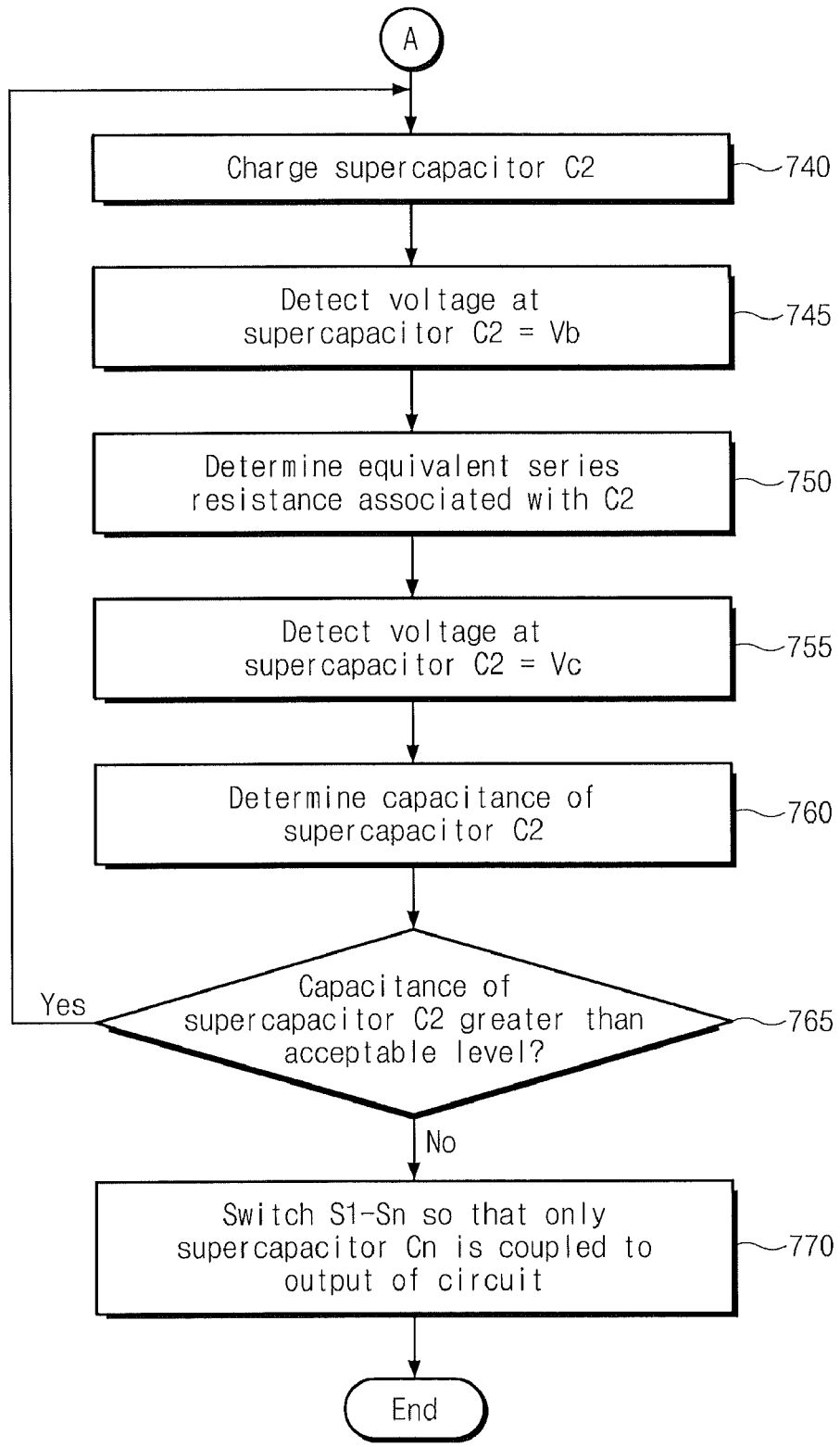

FIGS. 7A-7B illustrate operations of a supercapacitor controller circuit 110 to control the circuit 115 in FIG. 5. According to FIG. 7A, initially the switch S1 is in the closed position, whereas all other switches in the circuit 115 are in the open position so that only the first supercapacitor C1 is charged by the charging circuit 105 and used to provide auxiliary power to the device 100. During the initial operation, the charging circuit 105 charges the first supercapacitor C1 (Block 705). When the voltage at the input/output terminal 117 reaches Vb (Block 710) the supercapacitor controller circuit 110 can utilize equation (1) to determine the equivalent series resistance associated with the first supercapacitor C1 (Block 715).

The charger circuit 105 continues to charge the first supercapacitor C1 until the supercapacitor controller circuit 110 detects that the voltage at the input/output terminal 117 has reached Vc (Block 720). At this point, the supercapacitor controller circuit 110 can determine the capacitance of the supercapacitor C1 (Block 725), which can be combined with the equivalent series resistance to determine the total effect capacitance of the first supercapacitor C1.

If the total effective capacitance of the first supercapacitor C1 is determined to be greater than the acceptable level (Block 730), the supercapacitor controller circuit 110 maintains the settings of the switches in the circuit 115 so that only the first supercapacitor C1 continues to be charged and utilized to provide auxiliary power to the device 100. If, however, the total effect capacitance of the first supercapacitor C1 is less than the acceptable level (Block 730), the supercapacitor controller circuit 110 configures the switches S1-SN so that only the second supercapacitor C2 is charged by the charging circuit 105 and subsequently used to provide auxiliary power to the device 100 (Block 735).

Referring to FIG. 7B, the charging circuit 105 charges only the second supercapacitor C2 (Block 740) whereupon the supercapacitor controller circuit 110 detects when the voltage at the input/output terminal 117 reaches the voltage level Vb (Block 745), whereupon the equivalent series resistance of the second supercapacitor C2 can be determined (Block 750) as described above in reference to FIG. 4 and equation (1).

During the next phase of charging operations, the charging circuit 105 continues to charge the second supercapacitor C2 until the supercapacitor controller circuit 110 detects that the voltage at the input/output terminal 117 is equal to the Vc (Block 755), whereupon the total effective capacitance of the second supercapacitor C2 can be determined in combination with the equivalent series resistance (Block 760). If the total effective capacitance of the second supercapacitor C2 is determined to be greater than the acceptable level (Block 765), the supercapacitor controller circuit 110 maintains the switch settings S1-SN so that only the second supercapacitor C2 is charged by the charging circuit 105 and is used to provide auxiliary power to the device 100. If, however, the total effective capacitance of the supercapacitor C2 is determined to be less than the acceptable level (Block 765), the supercapacitor controller circuit 110 changes the settings of the switches S1-SN so that only the next supercapacitor is charged by the charging circuit 105 and subsequently used to provide auxiliary power to the device 100 (Block 770).

Figure 8:
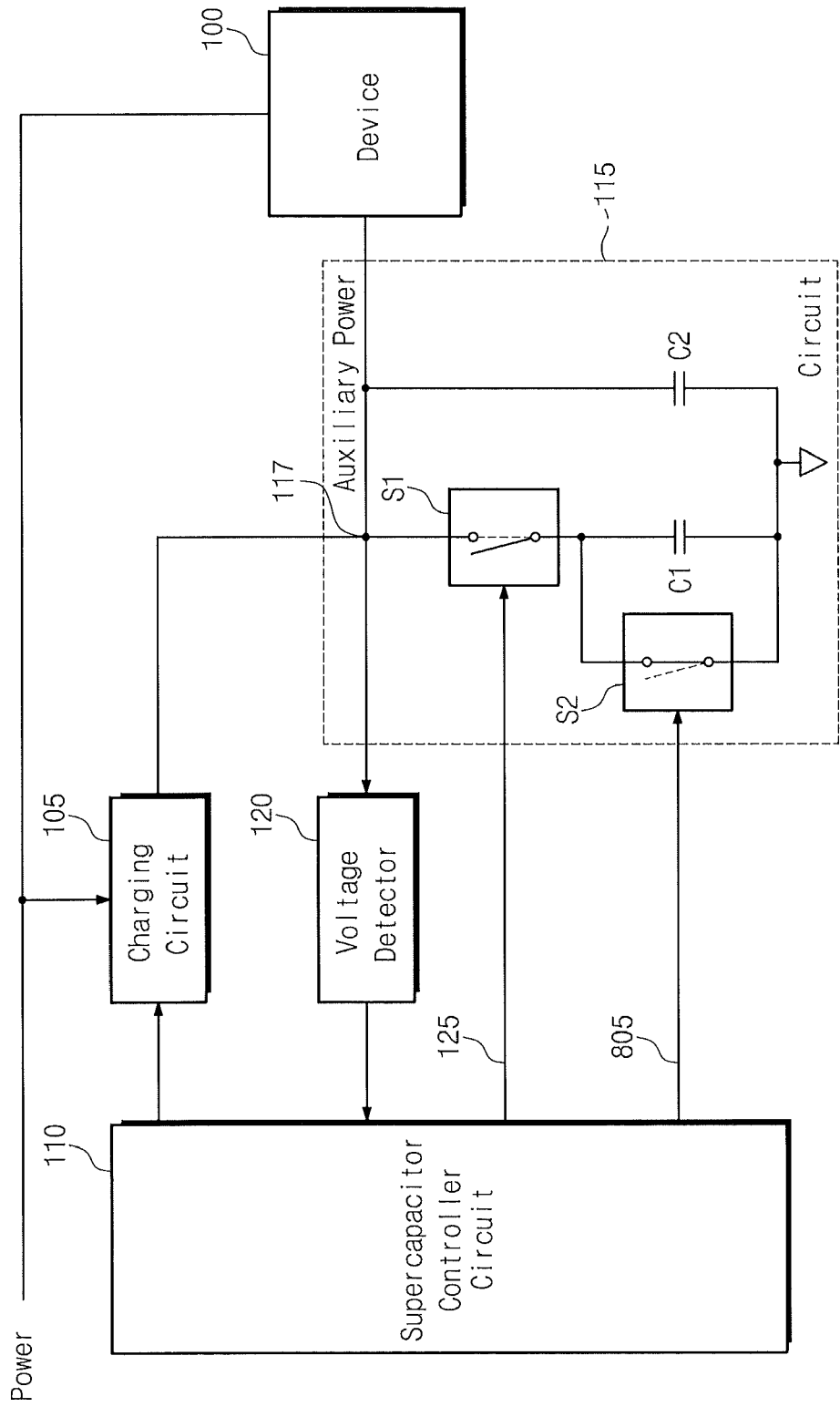
FIG. 8 is a block diagram which illustrates a circuit including supercapacitors and a supercapacitor grounding switch used to provide auxiliary power to a device in some embodiments according to the inventive concept.

FIG. 8 is a block diagram illustrating the circuit 115 including supercapacitors providing auxiliary power to the device 100 in some embodiments according to the inventive concept. According to FIG. 8, a second supercapacitor switch control signal 805 is provided to a supercapacitor grounding switch S2 coupled in parallel across the first supercapacitor C1. During initial operation of the circuit 115, the supercapacitor controller circuit 110 maintains the switch S1 in the open position so that only the second supercapacitor C2 is charged by the charging circuit 105 and is also the only supercapacitor used to provide auxiliary power to the device 100, until it is determined that the capacitance of the second supercapacitor C2 has been reduced below the acceptable level. During this initial phase of operation, the supercapacitor controller circuit 110 maintains the supercapacitor grounding switch S2 in the closed position so that no voltage may develop across the first supercapacitor C1.

As appreciated by the present inventors, maintaining the supercapacitor grounding switch S2 in the closed position across the first supercapacitor C1 can help avoid the development of a voltage across the first supercapacitor C1 despite the fact that the first switch S1 is maintained in the open position. Preventing the voltage from developing across the first supercapacitor C1 can help avoid unintended charging of the first supercapacitor C1 and thereby increase the likelihood that the first supercapacitor C1 is charged/discharged only after the supercapacitor controller circuit 110 determines the first supercapacitor C1 should be used to provide auxiliary power to the device 100. Accordingly, when the supercapacitor controller circuit 110 determines that the capacitance of the second supercapacitor C2 has been reduced below the acceptable level, the switch S1 is closed to couple the first supercapacitor C1 to the input/output terminal 117 and the supercapacitor grounding switch S2 is opened so the first supercapacitor C1 may be charged/discharged during subsequent operations.

It will be understood that although FIG. 8 illustrates the use of the supercapacitor grounding switch S2 across only the first supercapacitor C1, such an approach may be used in any of the embodiments disclosed herein. For example, in some embodiments according to the inventive concept as described above in reference to FIG. 1 a respective supercapacitor grounding switch may be provided across each of the supercapacitors included in the different branches of the circuit 115 so that when the supercapacitor controller circuit 110 determines that a new supercapacitor is to be switched in, the respective supercapacitor grounding switch is opened and the respective supercapacitor is switched to the input/output terminal 117.

Figure 9:
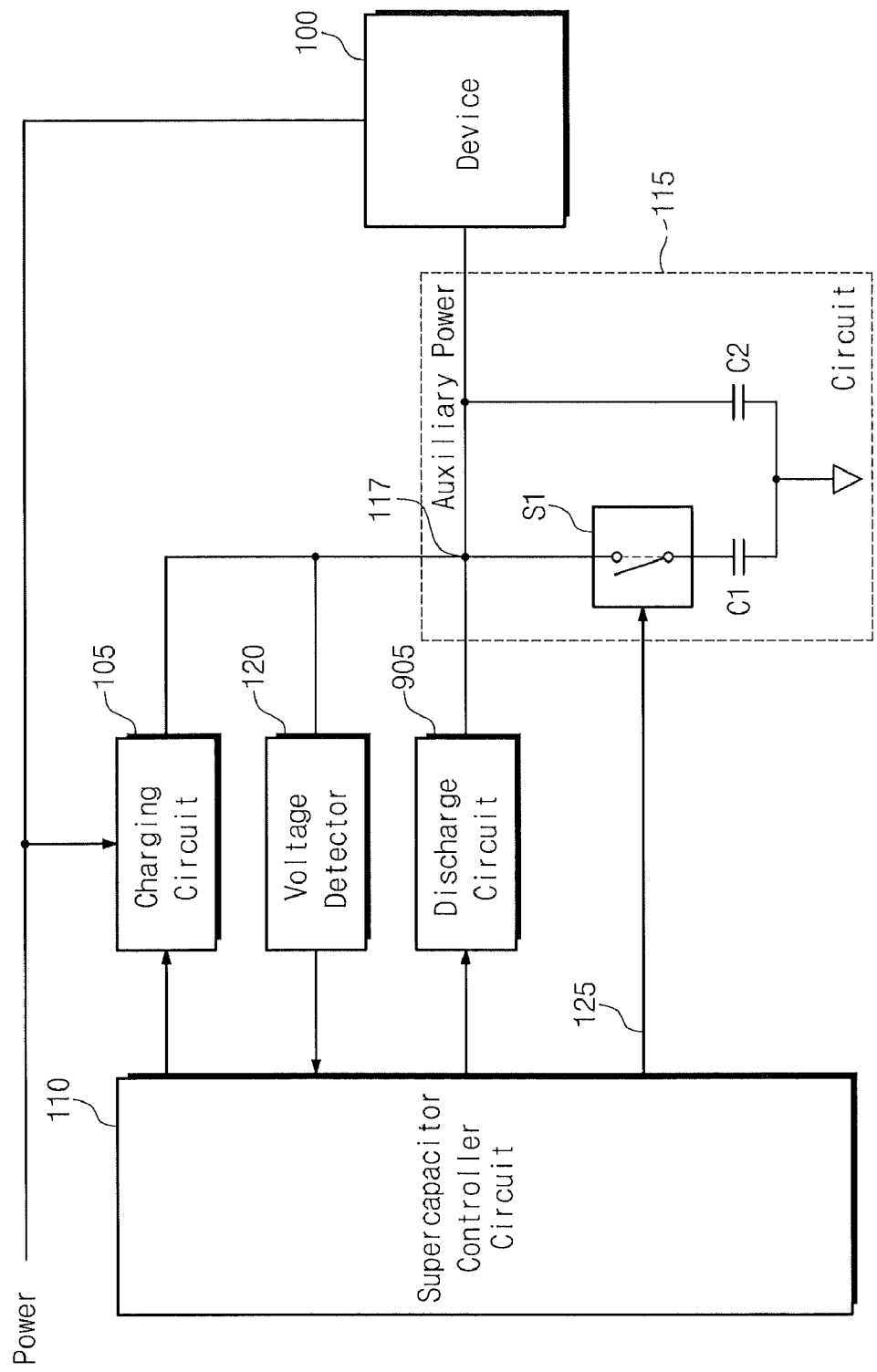
FIG. 9 is a block diagram which illustrates a circuit including supercapacitors used to provide auxiliary power to a device in some embodiments according to the inventive concept.

FIG. 9 is a block diagram which illustrates a circuit including supercapacitors provided as auxiliary power to the device 100 in some embodiments according to the inventive concept. According to FIG. 9, a discharge circuit 905 is coupled to the input/output terminal 117 along with the charging circuit 105 and the voltage detector circuit 120. The discharging circuit 905 operates under the control of the supercapacitor controller circuit 110 to periodically discharge the supercapacitor presently providing the auxiliary power to the device 100 so that the associated capacitance thereof can be evaluated to determine whether another supercapacitor should be switched into the circuit 115 to provide auxiliary power to the device 100.

Figure 10:
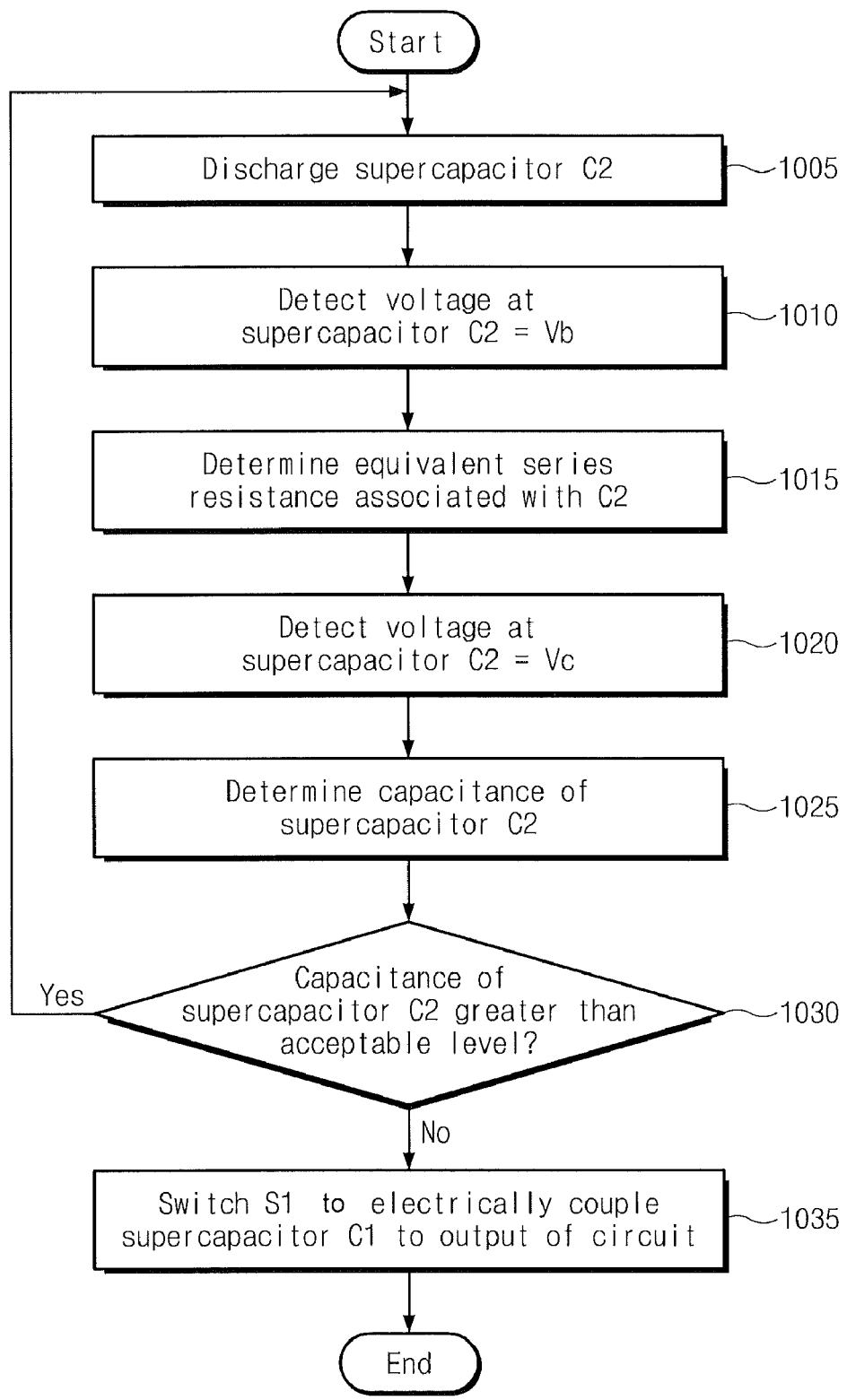
FIG. 10 is a flowchart which illustrates operations of a circuit including supercapacitors used to provide auxiliary power to a device in some embodiments according to the inventive concept.

FIG. 10 is a flow chart which illustrates operations of the supercapacitor controller circuit 110 in FIG. 9 in some embodiments according to the inventive concept. According to FIG. 10, the supercapacitor controller circuit 110 operates the circuit 115 to provide the second supercapacitor C2 as auxiliary power to the device 100. Accordingly, the charging circuit 105 is allowed to charge the second supercapacitor C2 after, for example, auxiliary power is provided to the device 100 so that the second supercapacitor C2 is charged.

Periodically, the supercapacitor controller circuit 110 controls the discharge circuit 905 to promote the discharge of the second supercapacitor C2 to evaluate the capacitance associated with the second supercapacitor C2 to determine whether the first supercapacitor C1 should be switched into the circuit 115 (Block 1005).

Figure 11:
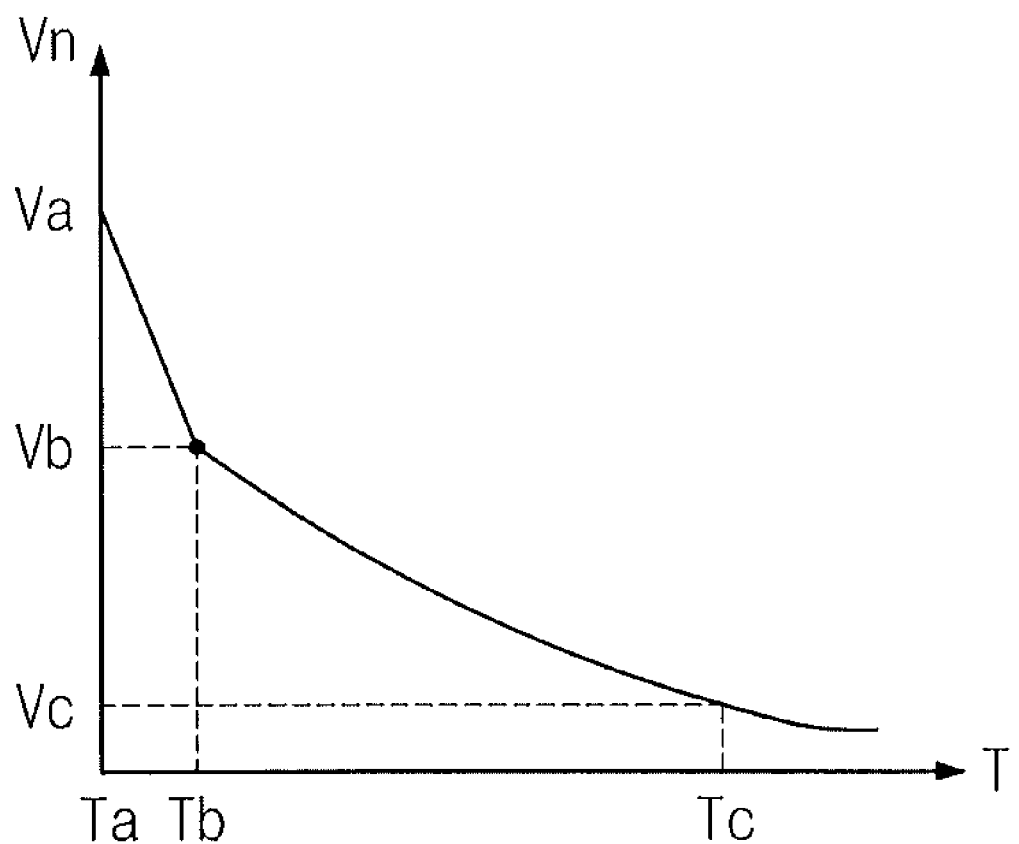
FIG. 11 is a graph which illustrates discharging of supercapacitors in a circuit used to provide auxiliary power to a device in some embodiments according to the inventive concept.

When the supercapacitor controller circuit 110 causes the second supercapacitor C2 to discharge, the initial voltage Va begins to fall during an initial discharge time interval to a voltage level Vb which is detected via the voltage detector circuit 120 as shown in FIG. 11 (Block 1010). During this initial discharge time interval from Ta-Tb, the supercapacitor controller circuit 110 can determine the equivalent series resistance associated with the second supercapacitor C2 using the following relationship defined as equation (2):

$$ESR = \frac{Va - Vb}{Id}$$

where Va is the initial voltage level at the input/output terminal 117, Vb is the voltage level at the input/output terminal 117 at Tb, and Id is the current provided from the second supercapacitor C2 during the discharge (Block 1015). It will be understood that the discharge circuit 905 can provide a discharge current path for the current from the second supercapacitor C2 during the discharge time interval. Accordingly, the discharge circuit 905 can be used to determine the discharge current Id sourced from the second supercapacitor C2 during the discharge time interval. In some embodiments according to the inventive concept, the capacitance can be determined during an actual discharge while the circuit 115 provides auxiliary power to the device 100.

During the subsequent discharge time interval of the second supercapacitor C2 the voltage is reduced to a level Vc, which is detected by the voltage detector circuit 120 (Block 1020), whereupon the supercapacitor controller circuit 110 can determine the capacitance of the second supercapacitor according to the following relationship defined as equation (3):

$$C1 = \frac{Id(Tc - Tb)}{Vb - Vc}$$

where Id is the discharge current provided during the subsequent discharge time interval, Tb is the time at the start of the subsequent discharge time interval, Tc is the time at the end of the subsequent discharge time interval, Vb is the voltage at the input/output terminal 117 at the time Tb, and Vc is the voltage at the input/output terminal 117 measured at the time Tc (Block 1025).

The supercapacitor controller circuit 110 can use the capacitance of the supercapacitor C2 and the equivalent series resistance to determine the total effective capacitance of the second supercapacitor C2 over the discharge time intervals. If the total effective capacitance of the second supercapacitor C2 is greater than the acceptable level (Block 1030), the operations of the circuit 115 are continued such that the supercapacitor controller circuit 110 periodically discharges the second supercapacitor C2 as described above in reference to Blocks 1005-1025. If, however, the total effective capacitance of the second supercapacitor C2 is determined to be equal to or less than the acceptable level (Block 1030), the supercapacitor controller circuit 110 closes the switch S1 to electrically couple the first supercapacitor C1 to the input/output terminal 117 to subsequently provide auxiliary power to the device 100 if needed.

Figure 12:
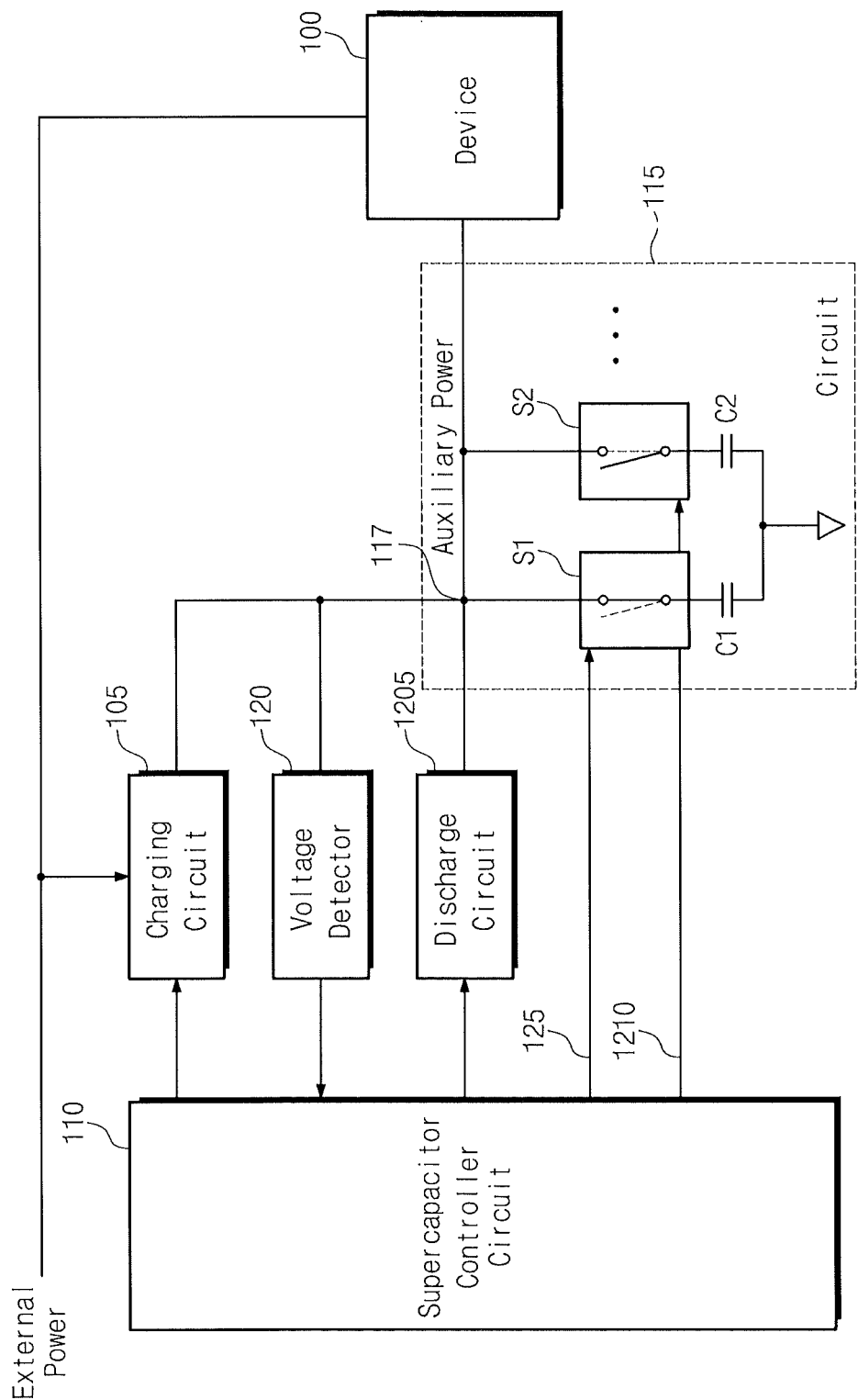
FIGS. 12-14 are block diagrams which illustrate circuits including supercapacitors used to provide auxiliary power to devices in some embodiments according to the inventive concept.

FIG. 12 is a block diagram illustrating the circuit 115 including supercapacitors used to provide auxiliary power to the device 100 in some embodiments according to the inventive concept. According to FIG. 12, the circuit 115 includes a plurality of branches each including a supercapacitor 1-N and a respective switch coupled in series with one another. The supercapacitor controller circuit 110 provides respective supercapacitor switch control signals electrically coupled to respective ones of the supercapacitors to control the positions thereof. In operation, the supercapacitor controller circuit 110 can independently control the positions of the switches S1-SN to control which of the supercapacitors C1-CN is provided by the circuit 115 as auxiliary power to the device 100 as described above in reference to, for example, FIG. 5.

The supercapacitor controller circuit 110 is further configured to determine the total effective capacitance associated with the first supercapacitor C1 using the discharge circuit 1205 as described, for example, in reference to FIG. 9. In other words, according to FIG. 12, the discharge approach can be used to determine when to switch additional supercapacitors to the input/output terminal 117 using the discharge approach described above in reference to FIGS. 9-11. In operation, the supercapacitor controller circuit 110 can determine when the capacitance of the currently used supercapacitor has been reduced to the acceptable level and can then electrically decouple the currently used supercapacitor while electrically coupling a new supercapacitor to the input/output terminal 117.

Figure 13:
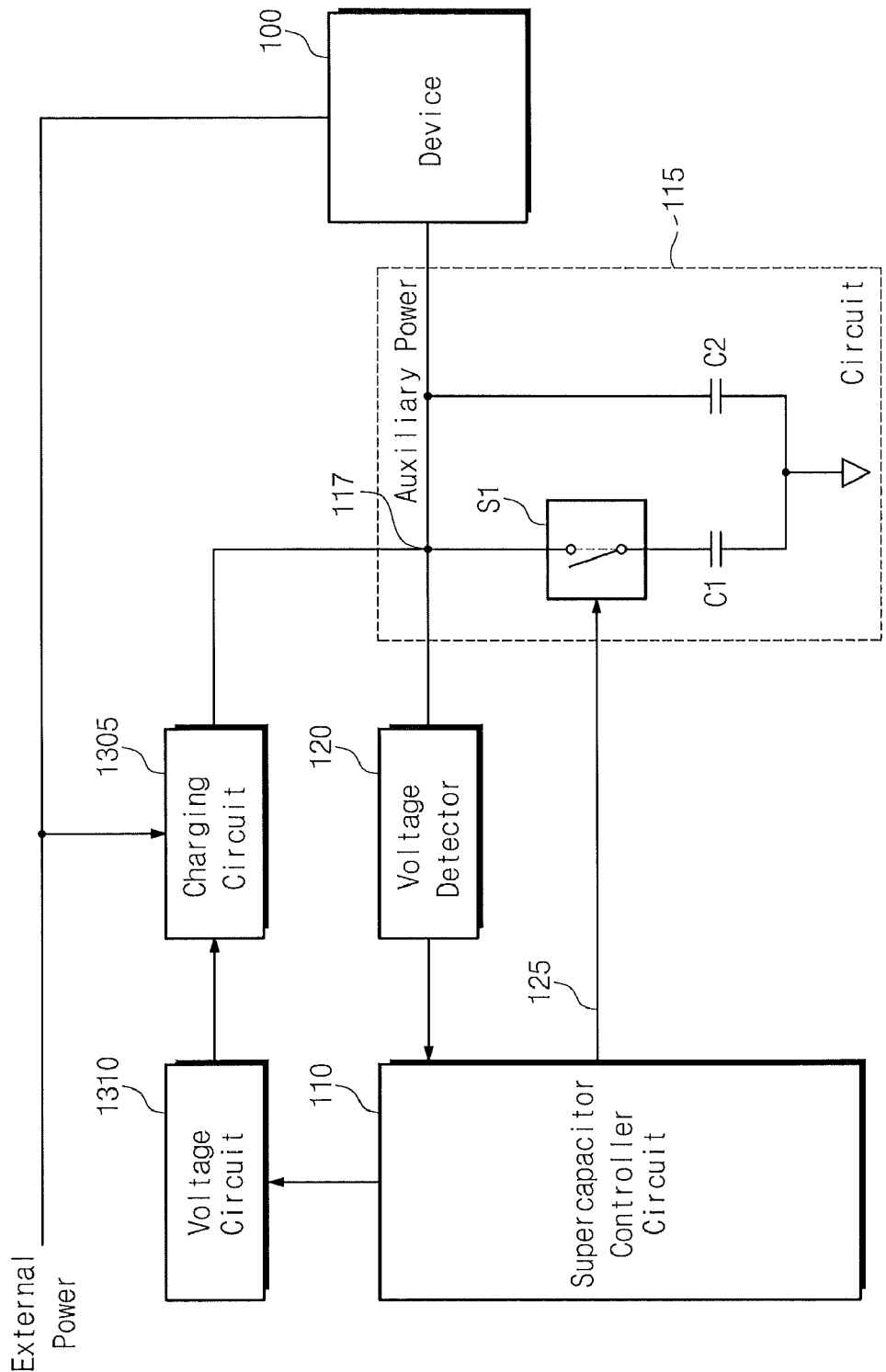

FIG. 13 is a block diagram illustrating the circuit 115 including supercapacitors used to provide auxiliary power to the device 100 in some embodiments according to the inventive concept. According to FIG. 13, a charging circuit 1305 is electrically coupled to the input/output terminal 117 and is configured to charge the supercapacitor selected by the supercapacitor controller circuit 110. The charging circuit 1305 is controlled using a voltage controller circuit 1310 which is configured to modify the current used to charge the supercapacitors during the charging interval. For example, in some embodiments according to the inventive concept, the voltage controller circuit 1310 can change the voltage provided to the charging circuit 1305 to modify the amount of current provided to the currently selected supercapacitor during the charging thereof.

In still other embodiments according to the inventive concept, the voltage controller circuit 1310 can change the voltage to the charging circuit 1305 to select different charging profiles based on which of the supercapacitors is currently selected to provide auxiliary power to the device 100. In particular, the charging circuit 1305 may apply a first current charging profile when only the second supercapacitor C2 is selected to provide auxiliary power. In contrast, the charging circuit 1305 can modify the current charging profile after the supercapacitor controller circuit 110 electrically couples the first supercapacitor C1 to the input/output terminal 117 thereby allowing both the first and second supercapacitors to provide the auxiliary power.

Figure 14:
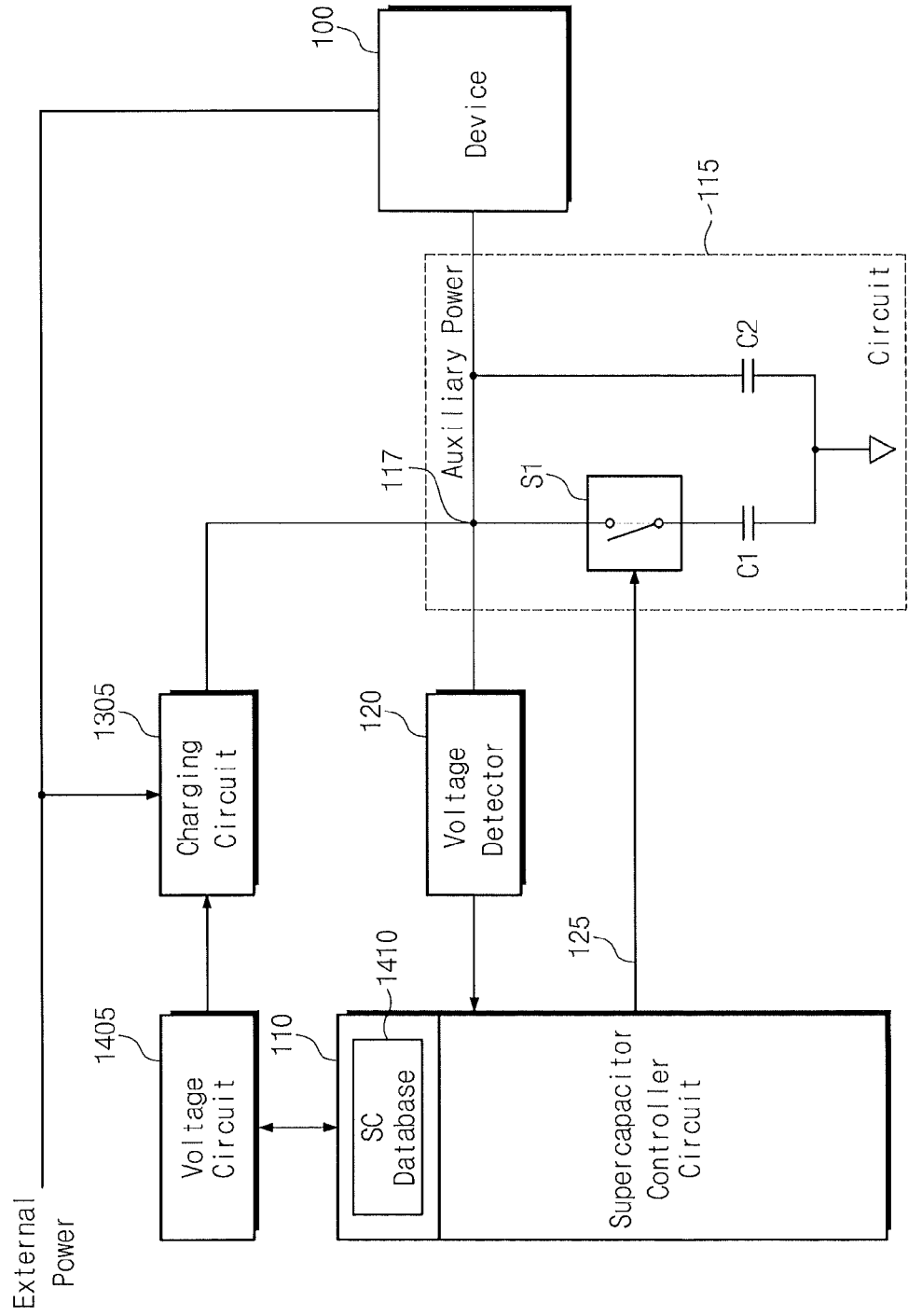

FIG. 14 is a block diagram which illustrates the circuit 115 including supercapacitors used to provide auxiliary power to the device 100 in some embodiments according to the inventive concept. According to FIG. 14, the charging circuit 1305 is configured to charge the supercapacitor selected to provide auxiliary power to the device 100 as described above in reference to FIG. 13. Further, a voltage controller circuit 1405 is electrically coupled to the charging circuit 1305 to control the charging profile used for the supercapacitors responsive to control by the supercapacitor controller circuit 110.

Moreover, the supercapacitor controller circuit 110 can control the voltage controller 1405 to change the charging profile via the charging circuit 1305 by accessing a supercapacitor database 1410. The supercapacitor database 1410 can store data related to different types of supercapacitors including which profiles may be used to effectively charge the different supercapacitors included in the circuit 115. In some embodiments according to the inventive concept, the supercapacitor database 1410 can include information related to what voltages represent the linear portions of the charging or discharging time interval described above in relation to FIGS. 4 and 11 to facilitate the determination of the equivalent series resistance for a particular supercapacitor. Still further, in some embodiments according to the inventive concept, the supercapacitor database 1410 can include an indication of the acceptable capacitance level for each of the supercapacitors included in the circuit 115. In still further embodiments according to the inventive concept, the supercapacitor data base 1410 may be used to store values of equivalent series resistance which indicate the respective supercapacitor may be approaching the point where it may no longer be able to provide auxiliary power to the device 100 and should be switched out of the circuit 115 via the supercapacitor controller circuit 110.

It will be understood that although the supercapacitor database 1410 is shown as included within the supercapacitor controller circuit 110, the supercapacitor data base 1410 may be located such that it is accessible to the supercapacitor controller circuit 110 but not included therein.

Figure 15:
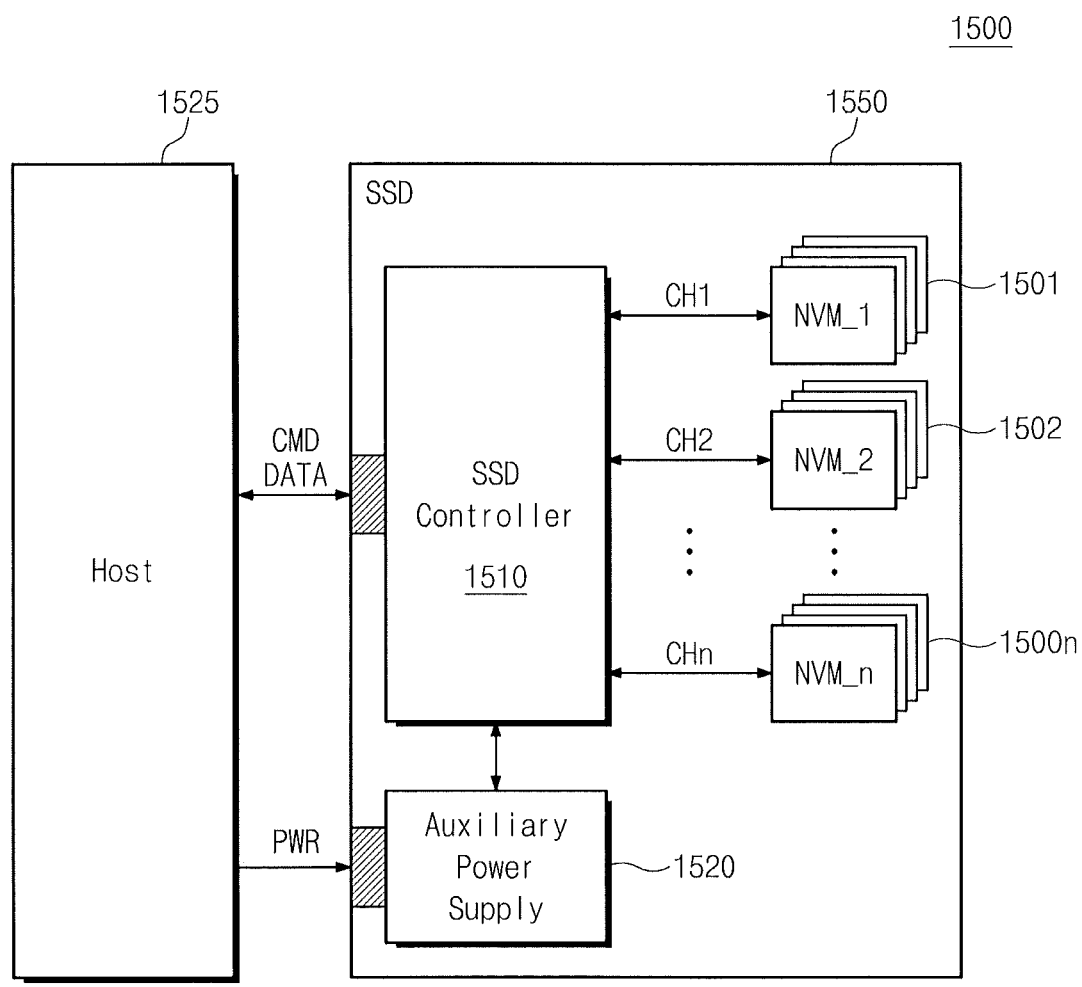
FIG. 15 is a block diagram illustrating a system including a host providing external power to a solid state device including circuits with supercapacitors used to provide auxiliary power to the device in some embodiments according to the inventive concept.

FIG. 15 is a block diagram illustrating a system 1500 including a host 1525 electrically coupled to a solid state device 1550 which includes an auxiliary power supply 1520 used to provide auxiliary power to portions of the device 1550 when external power provided by the host is abruptly removed in some embodiments according to the inventive concept. In particular, the host 1525 can provide command and data information to the device 1550 which can be used by a solid state device controller 1510 to store/retrieve data to/from non-volatile memories NVM_1-$n$ via respective data channels ch1-chn. In operation, the auxiliary power supply 1520 can provide auxiliary power to at least portions of the device controller 1510 in accordance with the embodiments described herein when power provided by the host 1525 is abruptly removed.

Figure 16:
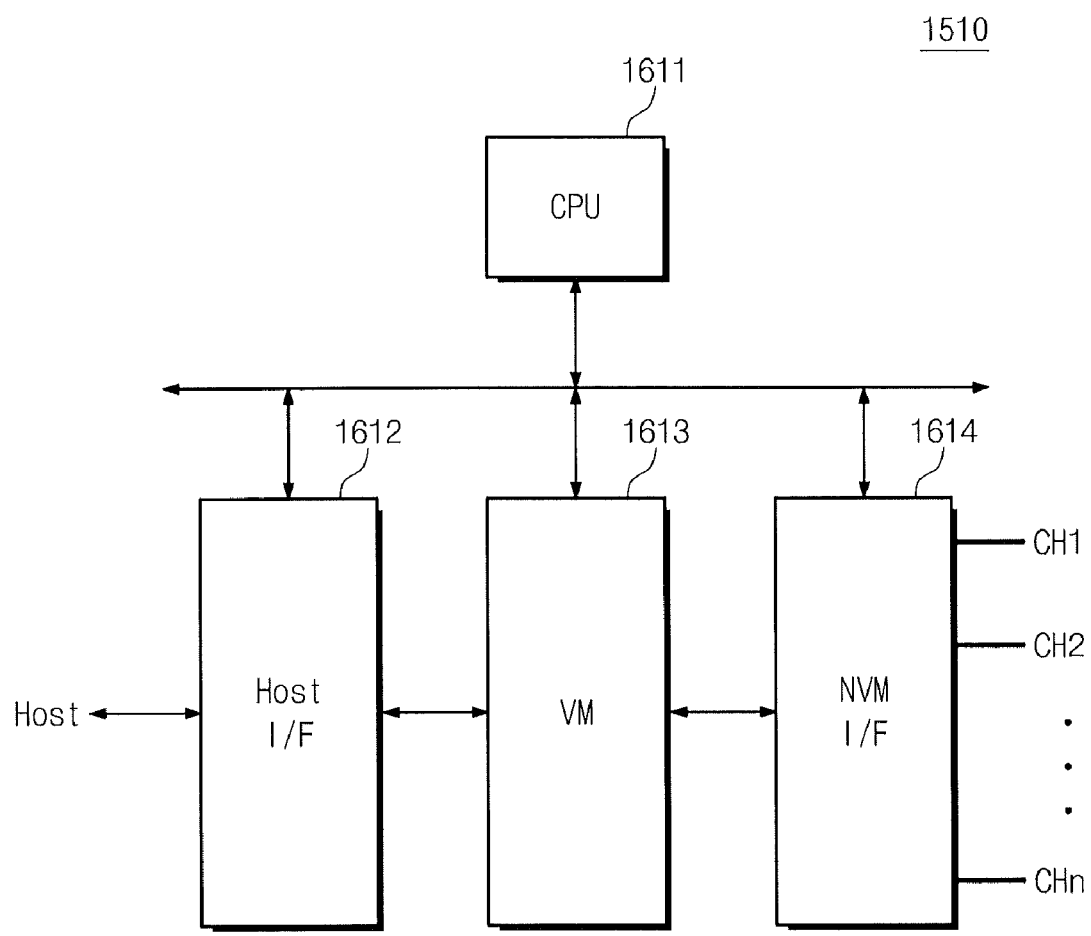
FIG. 16 is a block diagram illustrating a controller circuit included in a solid state device in some embodiments according to the inventive concept.

FIG. 16 is a block diagram illustrating portions of the device controller 1510 in some embodiments according to the inventive concept. According to FIG. 16, the device controller 1510 can include a host interface circuit 1612 which can communicate with each of the other sub-systems shown. Specifically, the device controller 1510 can include a central processing unit 1611 which can communicate with the host interface circuit 1612 and a volatile memory 1613 and non-volatile memory interface 1614 coupled to the respective channels ch1-chn. It will be understood each of the portions of the device controller 1510 shown in FIG. 16 can be provided with auxiliary power by the auxiliary power supply 1520 if power provided by the host 1525 is abruptly removed.

Figure 17:
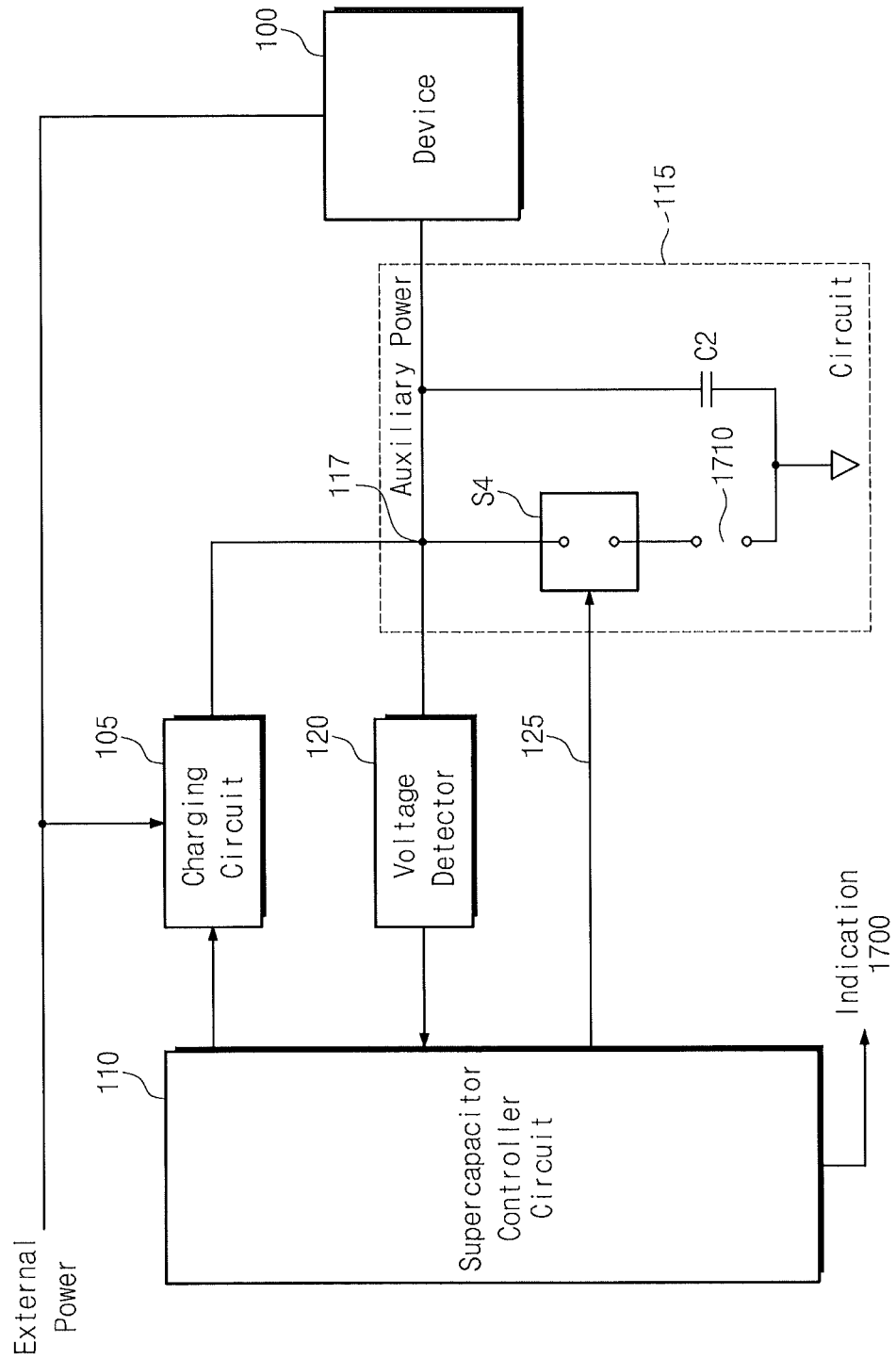
FIG. 17 is a block diagram illustrating the circuit including an installed supercapacitor and circuitry configured to accept the installation of a supplemental supercapacitor and switch as part of an installation kit in some embodiments according to the inventive concept.

FIG. 17 is a block diagram illustrating the circuit 115 including an installed supercapacitor and circuitry configured to accept the installation of a supplemental supercapacitor and switch as part of an installation kit in some embodiments according to the inventive concept. According to FIG. 17, the supercapacitor controller circuit 110 can operate the circuit 115 as described above in reference to, for example, FIG. 1. However, the super capacitor controller circuit 110 can be additionally configured to provide a indication 1700 that a supplemental supercapacitor may soon be needed to maintain a capable source of auxiliary power due to depletion of the installed supercapacitor C2.

For example, in some embodiments according to the inventive concept as illustrated in FIG. 17, the supercapacitor controller circuit 110 can provide the indication 1700 signaling that the capacitance of the currently installed supercapacitor C2 is approaching the acceptable level and, further, that if desired a supplemental supercapacitor should be installed at location 1710 along with a switch s4 configured to operate responsive to the supercapacitor switch signal 125.

The user of the system can, for example, purchase a kit responsive to the indication 1700 which can then be installed in the circuit 115. In some embodiments according to the inventive concept, the kit can include a supplemental supercapacitor that that is configured for installation in the circuit 115 which already includes the installed supercapacitor C2. The kit can also include the switch S4 which is configured for electrically coupling the supplemental supercapacitor into the circuit 115 once the supercapacitor controller circuit 110 determines that the installed super capacitor C2 has reached the acceptable level. It will be further understood that although FIG. 17 illustrates a configuration for the installation of only a single supplemental supercapacitor, additional supplemental supercapacitors can also be used.

Many alterations and modifications may be made by those having ordinary skill in the art, given the benefit of present disclosure, without departing from the spirit and scope of the invention. Therefore, it must be understood that the illustrated embodiments according to the inventive concept have been set forth only for the purposes of example, and that it should not be taken as limiting the inventive concept as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive concept.

What is claimed:

1. A circuit comprising:
  a first supercapacitor;
  a second supercapacitor;
  a first supercapacitor switch configured to couple and decouple the first supercapacitor to and from a device;
  a second supercapacitor switch configured to couple and decouple the second supercapacitor to and from the device; and
  a supercapacitor switch controller circuit configured to generate a measure of quality of the second supercapacitor and to cause the second supercapacitor switch to decouple the second supercapacitor from the device and the first supercapacitor switch to couple the first supercapacitor to the device responsive to the determined quality measure meeting a predetermined criterion.

2. The circuit according to claim 1 wherein the supercapacitor switch controller is further configured to:
  determine that a capacitance of the second supercapacitor has been reduced below an acceptable level based on determining an equivalent series resistance of the second supercapacitor using a change in voltage at the second supercapacitor during a charging time interval and a charging current provided to the second supercapacitor during the charging time interval.

3. The circuit device according to claim 1 wherein the supercapacitor controller circuit is further configured to:
  determine that a capacitance of the second supercapacitor has been reduced below an acceptable level based on determining an equivalent series resistance of the second supercapacitor using a discharge current provided by the second supercapacitor during a discharge time interval and a change in voltage at the second supercapacitor during the discharge time interval.

4. The circuit device according to claim 1 further comprising:
  a supercapacitor grounding switch electrically coupled to the first and second terminals of the first supercapacitor, wherein the supercapacitor controller circuit is further configured to maintain the supercapacitor grounding switch in a closed position while the supercapacitor switch is in the open position.

5. The circuit device according to claim 4 wherein the supercapacitor controller circuit is further configured to open the supercapacitor grounding switch responsive to determining that the capacitance of the second supercapacitor has been reduced to below the acceptable level.

6. The circuit according to claim 1 further comprising:

a voltage controller circuit configured to change a charging current provided by a charging circuit to the second supercapacitor during charging.

7. The circuit according to claim 6 wherein the voltage controller circuit is configured to provide the charging current responsive to an indication of a particular supercapacitor undergoing charging, wherein the indication of the particular supercapacitor is included in a supercapacitor database accessible to the supercapacitor controller circuit.

8. The circuit according to claim 1 further comprising:

a plurality of currently un-used supercapacitors; and a plurality of switches electrically coupled to respective ones of the currently un-used supercapacitors, configured to separately switch the respective ones of the currently un-used supercapacitors to the second terminal of the supercapacitor switch responsive to respective switch control signals from the supercapacitor controller circuit.

9. A method comprising:

determining a quality indication of at least one supercapacitor currently used to provide auxiliary power to an electronic device based on a current of the currently used at least one capacitor over a time interval during a charge event or a discharge event; and connecting at least one currently un-used supercapacitor to the electronic device based on the determined quality indication to provide auxiliary power to the electronic device.

10. The method according to claim 9 wherein the determined quality indication comprises an equivalent series resistance of the currently used at least one supercapacitor.

11. The method according to claim 10 wherein the determined quality indication comprises the equivalent series resistance and a capacitance of the currently used at least one supercapacitor.

12. The method according to claim 11 wherein connecting at least one currently un-used supercapacitor comprises connecting the at least one currently un-used supercapacitor after the capacitance of the currently used at least one supercapacitor has been reduced to below an acceptable level.

13. The method according to claim 10 wherein determining a quality indication comprises determining the equivalent series resistance of the currently used at least one supercapacitor using a measure of current provided to the currently used at least one supercapacitor during a portion of a charge interval defined by a change in voltage at the currently used at least one supercapacitor.

14. The method according to claim 10 wherein determining a quality indication comprises determining the equivalent series resistance of the currently used at least one supercapacitor using a measure of current drawn from the currently used at least one supercapacitor during a portion of a discharge interval defined by a change in voltage at the currently used at least one supercapacitor.

15. The method according to claim 9 further comprising:

disconnecting the currently used supercapacitor so that the currently used supercapacitor is not used in combination with the currently un-used supercapacitor to provide auxiliary power to the device.

16. The method according to claim 9 further comprising:

maintaining a connection of the currently used supercapacitor to the electronic device so that the currently un-used supercapacitor and the currently used supercapacitor are used in combination with one another to provide auxiliary power to the device.

17. The method according to claim 16 wherein maintaining a connection of the currently used supercapacitor to the electronic device comprises maintaining the connection of the currently used supercapacitor to the electronic device after determining that a capacitance of the currently used supercapacitor is below a first acceptable level, and wherein the method further comprises:

determining that a combined capacitance of the currently used and currently un-used supercapacitor, after switching, is below a second acceptable level, wherein the second acceptable level is different than the first acceptable level or is equal of the first acceptable level.

18. An apparatus comprising:

a plurality of supercapacitors; and an auxiliary power supply circuit configured to selectively connect the plurality of supercapacitors to an electronic device to provide power thereto, the auxiliary power supply circuit configured to determine a quality indication of a currently used at least one supercapacitor based on a current of the currently used at least one supercapacitor over a time interval during a charge event or a discharge event and to connect at least one currently un-used supercapacitor to the electronic device based on the quality indication.

19. The apparatus according to claim 18 wherein the quality indication comprises an equivalent series resistance of the currently used at least one supercapacitor.

20. The apparatus according to claim 19 wherein the quality indication comprises the equivalent series resistance and a capacitance of the currently used at least one supercapacitor.

21. The apparatus according to claim 19 wherein the auxiliary power supply circuit is configured to determine the equivalent series resistance of the currently used at least one supercapacitor using a measure of current provided to the currently used at least one supercapacitor during a portion of a charge interval defined by a change in voltage at the currently used at least one supercapacitor.

22. The apparatus according to claim 19 wherein the auxiliary power supply circuit is configured to determine the equivalent series resistance of the currently used at least one supercapacitor using a measure of current drawn from the currently used at least one supercapacitor during a portion of a discharge interval defined by a change in voltage at the currently used at least one supercapacitor.

* * * * *